(12) United States Patent
VanAntwerp et al.

(10) Patent No.: US 11,340,872 B1
(45) Date of Patent: May 24, 2022

(54) METHOD AND SYSTEM FOR GENERATING DYNAMIC USER EXPERIENCE APPLICATIONS

(71) Applicant: STATE FARM MUTUAL AUTOMOBILE INSURANCE COMPANY, Bloomington, IL (US)

(72) Inventors: John M. VanAntwerp, Normal, IL (US); Dan Kalmes, Bloomington, IL (US); Victoria Ann Spaulding-Burford, Marietta, GA (US); Marc Anderson, Decatur, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 457 days.

(21) Appl. No.: 16/001,553

(22) Filed: Jun. 6, 2018

Related U.S. Application Data

(60) Provisional application No. 62/535,613, filed on Jul. 21, 2017.

(51) Int. Cl.
*G06F 9/46* (2006.01)
*G06F 9/44* (2018.01)
(Continued)

(52) U.S. Cl.
CPC ............ *G06F 8/20* (2013.01); *G06Q 10/067* (2013.01); *G06F 3/04817* (2013.01); *G06F 8/10* (2013.01);
(Continued)

(58) Field of Classification Search
CPC .......... G06F 3/04817; G06F 8/20; G06F 8/10; G06F 9/5038; G06F 17/3089;
(Continued)

(56) References Cited

U.S. PATENT DOCUMENTS 6,314,415 B1    11/2001  Mukherjee
7,752,092 B1    7/2010   Mattice et al.
(Continued)

OTHER PUBLICATIONS

Joachim Herbst et al., Integrating Machine Learning and Workflow Management to Support Acquisition and Adaptation of Workflow Models, 2000, [Retrieved on Dec. 28, 2021], Retrieved from the internet: <URL: https://onlinelibrary.wiley.com/doi/pdf> 26 Pages (67-92) (Year: 2000).*

(Continued)

*Primary Examiner* — Anibal Rivera
(74) *Attorney, Agent, or Firm* — Lee & Hayes, P.C.

(57) ABSTRACT

Systems and methods may be provided for generating applications that may be agile, personalized, quickly delivered, and capable of being seamlessly integrated across an organization. The behavior and functionality of the applications (e.g., user interfaces therein) may be tailored specifically to individual users in response to learned user preferences. Consequently, these dynamic user experience (UX) applications may be rapidly deployed and capable of providing a satisfactory yet complete user experience across one or more applications. The methods and systems may include receiving a user objective, selecting a path associated with one or more steps, generating a dynamic UX application based on the steps, transmitting the dynamic UX application to the user, and displaying the dynamic UX application.

2 Claims, 7 Drawing Sheets

(51) Int. Cl.
*G06Q 40/00* (2012.01)
*G06F 8/20* (2018.01)
*G06Q 10/06* (2012.01)
*H04L 67/306* (2022.01)
*G06F 8/10* (2018.01)
*G06F 3/04817* (2022.01)
*G06F 9/50* (2006.01)

(52) U.S. Cl.
CPC ....... *G06F 9/5038* (2013.01); *G06Q 10/0633* (2013.01); *G06Q 40/123* (2013.12); *H04L 67/306* (2013.01)

(58) Field of Classification Search
CPC ............... G06F 17/30884; G06F 3/167; G06F 16/90324; G06Q 10/06; G06Q 10/00; G06Q 10/0633; G06Q 40/123
See application file for complete search history.

(56) References Cited

U.S. PATENT DOCUMENTS

| | | | |
|---|---|---|---|
| 7,818,341 B2* | 10/2010 | Kurien | G06F 17/3089 707/758 |
| 9,086,914 B2 | 7/2015 | Bolohan et al. | |
| 2002/0161911 A1 | 10/2002 | Pinckney, III et al. | |
| 2006/0005140 A1 | 1/2006 | Crew et al. | |
| 2006/0074735 A1 | 4/2006 | Shukla et al. | |
| 2008/0154935 A1 | 6/2008 | Draeger et al. | |
| 2011/0282941 A1 | 11/2011 | Chan et al. | |
| 2012/0303756 A1 | 11/2012 | Bolohan et al. | |
| 2013/0152001 A1 | 6/2013 | Lovitt et al. | |
| 2013/0158964 A1 | 6/2013 | Hall et al. | |
| 2013/0159228 A1 | 6/2013 | Meijer et al. | |
| 2013/0173719 A1 | 7/2013 | Ahmed et al. | |
| 2014/0122497 A1 | 5/2014 | Eigner et al. | |
| 2014/0229898 A1* | 8/2014 | Terwedo | G06F 3/04817 715/835 |
| 2016/0147729 A1 | 5/2016 | Sivertson et al. | |
| 2016/0147828 A1* | 5/2016 | Yu | G06Q 40/123 705/31 |
| 2016/0259534 A1 | 9/2016 | Simons et al. | |
| 2016/0275627 A1* | 9/2016 | Wang | G06Q 40/123 |
| 2016/0283889 A1* | 9/2016 | Shukla | G06Q 10/063114 |
| 2017/0132200 A1 | 5/2017 | Noland et al. | |
| 2017/0161855 A1 | 6/2017 | Schreyer | |
| 2017/0220963 A1* | 8/2017 | Canaran | G06F 3/167 |
| 2017/0315782 A1* | 11/2017 | Chaudhry | G06F 8/20 |
| 2017/0315789 A1 | 11/2017 | Lam et al. | |
| 2017/0316363 A1* | 11/2017 | Siciliano | G06F 3/0482 |
| 2017/0357627 A1 | 12/2017 | Peterson et al. | |
| 2018/0108093 A1* | 4/2018 | Podgorny | G06F 16/90324 |
| 2018/0210619 A1 | 7/2018 | Mowatt et al. | |

OTHER PUBLICATIONS

"Common SMS Problems and Howto Solve Them, Part 1", Laura Schaffer, Twilio Blog, https://www.twilio.com/blog/2015/08/common-sms-problems-and-how-to-solve-them-part-1.html, Aug. 21, 2015.

Office Action for U.S. Appl. No. 16/001,629, dated Jul. 9, 2021, VanAntwerp, "Method and System for Reconciling User Interactions", 14 Pages.

Final Office Action dated Jul. 23, 2020 for U.S. Appl. No. 16/001,629, "Method and System for Reconciling User Interactions", VanAntwerp, 9 pages.

Final Office Action dated Aug. 6, 2020 for U.S. Appl. No. 16/001,571, "Method and System for Administering Dynamic User Experience Applications", VanAntwerp, 20 pages.

Office Action for U.S. Appl. No. 16/001,602, dated Sep. 2, 2021, VanAntwerp, "Method and System for Optimizing Dynamic User Experience Applications", 25 Pages.

Non Final Office Action dated Jan. 24, 2020 for U.S. Appl. No. 16/001,571 "Method and System for Administering Dynamic User Experience Applications" VanAntwerp, 9 pages.

Office Action dated Jan. 7, 2021 for U.S. Appl. No. 16/001,629, "Method and System for Reconciling User Nteractions", VanAntwerp, 9 pages.

Office Action dated Feb. 22, 2021 for U.S. Appl. No. 16/001,571, "Method and System for Administering Dynamic User Experience Applications", VanAntwerp, 11 pages.

Office Action dated Mar. 2, 2021 for U.S. Appl. No. 16/001,602 "Method and System for Optimizing Dynamic User Experience Applications" VanAntwerp, 20 pages.

Final Office Action dated Mar. 4, 2020 for U.S. Appl. No. 16/001,602 "Method and System for Optimizing Dynamic User Experience Applications" VanAntwerp, 19 pages.

Office action for U.S. Appl. No. 16/001,629, dated Apr. 3, 2020, VanAntwerp, "Method and System for Reconciling User Interactions", 8 pages.

Non Final Office Action dated May 29, 2020 for U.S. Appl. No. 16/001,643 "Method and System of Generating Generic Protocol Handlers" VanAntwerp, 12 pages.

Office Action for U.S. Appl. No. 16/001,571, dated Aug. 31, 2021, Kalmes, "Method and System for Administering Dynamic User Experience Applications", 11 pages.

* cited by examiner

METHOD AND SYSTEM FOR GENERATING DYNAMIC USER EXPERIENCE APPLICATIONS

CROSS-REFERENCE TO RELATED APPLICATION

The present application claims priority to U.S. Provisional Application No. 62/535,613, filed Jul. 21, 2017. The priority application is hereby incorporated by reference.

FIELD OF THE DISCLOSURE

The present disclosure generally relates to techniques for providing computer-implemented applications, and more specifically, to techniques for generating and executing dynamic user experience within applications.

BACKGROUND

Typically, an organization may offer a number of computer implemented applications (e.g., web applications, mobile applications, and/or desktop software applications) via which users (e.g., the organization's customers, clients, and/or employees) may interact with the organization and its offered services and/or products. For example, the organization may offer an application via which a user may apply for a credit card, mortgage, or another financial product. The application may include one or more user interfaces (UI) via which the user may provide personal information relevant to acquiring the product.

With regard to applications, a need exists for the organization to provide a satisfactory and consistent user experience (UX) for the users within one application, and/or across multiple applications offered by the organization. In this context, "user experience" may generally refer to the systems and practices via which one or more users may interact with a system or product (e.g., an application), and the UX may include one or more user interfaces (UI) via which the application may present information to users and/or receive user input (e.g., information or commands). However, the methods and systems of generating applications (and consequently, the applications themselves) may be affected by a number of challenges that may negatively affect UX with regard to one or more applications. These challenges may include, but are not limited to, lack of agility, lack of personalization, slow delivery, and/or integration difficulty.

First, application UX generally lacks business agility due to tight coupling in business process flows. Specifically, business logic may be contained in presentation and/or service layers (e.g., in both a client application and a server application). Such coupling may require changes to multiple components and extensive testing when business logic changes. Core business logic may be packaged in the same deployable file as an application, requiring regression testing over an entire application when only small changes are made to business logic.

Second, applications generally lack personalized UX. For example, the same one or more user interfaces often provided to every user of an application, and the business logic that drives an interaction with a user may not be personalized or individualized, but rather may be similar or identical for all users. Changing the UX (e.g., changing a user interface) for one user may propagate unwanted changes to other users, and consequently, an individual or personalized UX may not be achieved.

Third, current methods and systems for generating applications require too much time and cost to deliver. For instance, simple modifications to an application may cause time consuming, cascading changes across one or more applications. Consequently, an organization may be unable to quickly modify an application to improve UX in response to recognized market demands, opportunities, and/or usage analytics. Further, organization stakeholders may actively resist change due to the unforeseen consequences of modifying code. Even a "continuous delivery" solution (the process of small, incremental software releases), may not be possible due to the aforementioned tight coupling of UX and business process flows, and/or because the nature of the code modifications may require that code modifications be made "all or nothing" instead of continuously.

Fourth, integration of multiple systems and/or applications within an organization may be difficult. Inconsistent application programming interfaces (APIs), data schemas, and aspects of product "look-and-feel" may emerge over time, particularly within large software enterprises that lack or do not closely follow standardization practices. Integration may also be particularly difficult in large software ecosystems comprising multiple sub-systems which have been developed independently over time and/or developed by different teams within a large and/or mature organization.

BRIEF SUMMARY

In one aspect, a method for generating dynamic user experience applications includes receiving an objective of the user, selecting a path corresponding to the objective wherein the path is associated with one or more executable steps, generating a dynamic application by analyzing the one or more executable steps, transmitting at least a portion of the dynamic application to a device of the user, and displaying the at least the portion of the dynamic application in the device of the user.

In another aspect a computing system including one or more processors and one or more memories storing instructions is provided. When the instructions are executed by the one or more processors, they cause the computing system to receive an objective of the user, and select a path corresponding to the objective, wherein the path being associated with one or more executable steps. The instructions may further cause the computing system to generate a dynamic application by analyzing the one or more steps, transmit at least a portion of the dynamic application to a device of the user, and display the at least the portion of the dynamic application in the device of the user.

BRIEF DESCRIPTION OF THE FIGURES

The figures described below depict various aspects of the system and methods disclosed herein. It should be understood that each figure depicts an embodiment of a particular aspect of the disclosed system and methods, and that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

I. Overview

Figure 1:
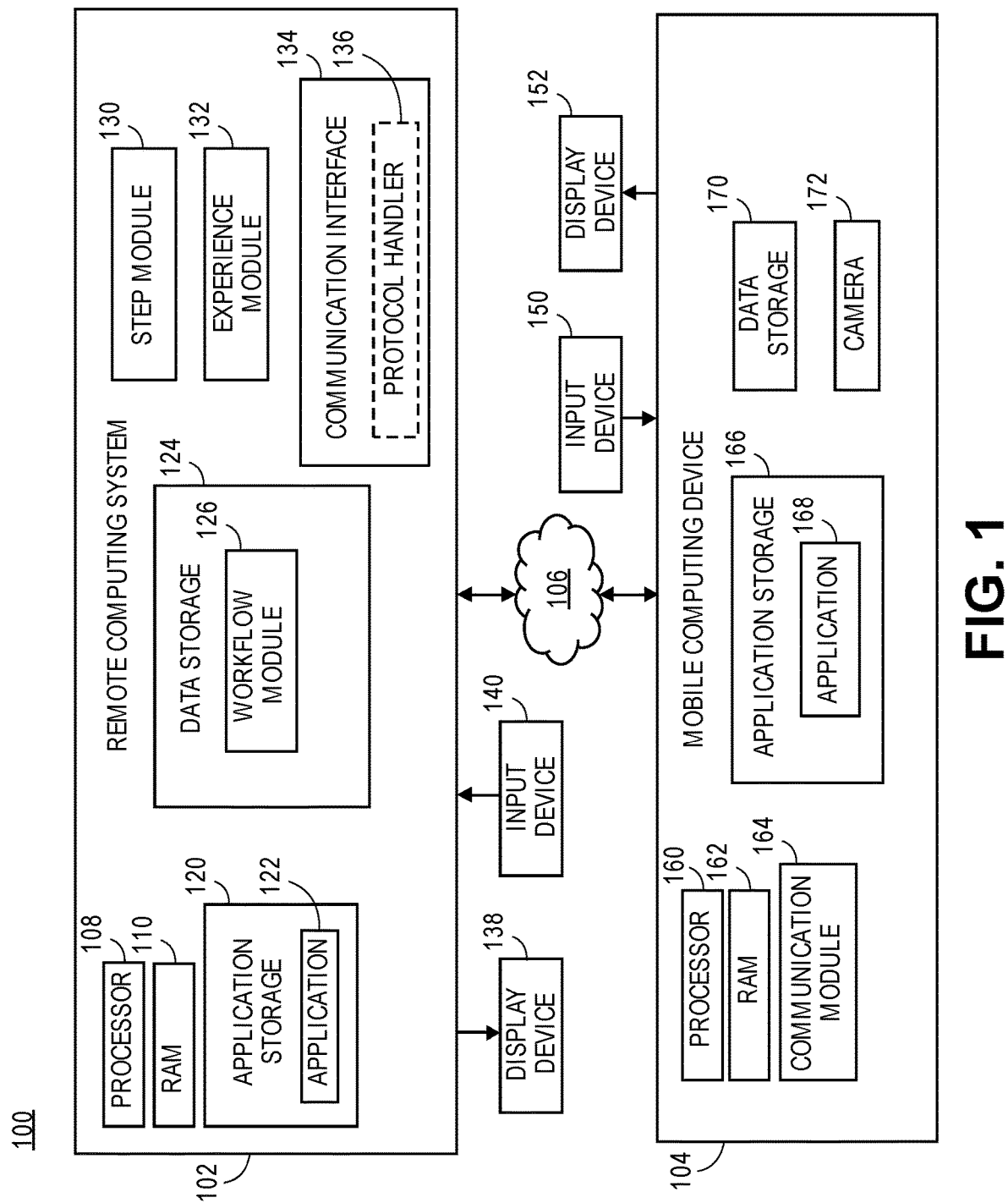
FIG. 1 depicts an environment for generating dynamic UX applications, according to an embodiment.

The embodiments described herein relate to, inter alia, generating computer-implemented dynamic UX applications that are agile, personalized, quickly delivered, and capable of being seamlessly integrated across an organization (e.g., a large business entity). More specifically, techniques may be used to generate one or more dynamic UX applications, the behavior and functionality of which an organization may dynamically modify as the application is installed or running in a client computing device, without requiring redeployment of the application to the client users. Techniques may be used to generate a dynamic UX application to carry out business processes organized into a workflow or path comprising a series of steps. The dynamic UX applications generated according to techniques described herein may include behavior and functionality specific to the user of the application, may be rapidly deployed using conventional or proprietary deployment techniques, and may be capable of communicating and exchanging data in a common format with other applications deployed across an organization. Business information and UX information may be entirely decoupled, and may be independently evaluated/executed, and scaled horizontally.

In some embodiments, a client application may be provided to a mobile computing device (e.g., a laptop, server, smartphone, wearable device, etc.) of a user. The client application may allow the user to construct a dynamic user experience application. The client application may cause the mobile computing device to access a remote computing device (e.g., a server), and may transmit instructions or messages to the remote computing device which cause a path management application, or workflow manager application, along with associated steps, to be created, modified, and/or stored in the remote computing device. Herein, the terms "path" and "workflow" may be used interchangeably. The path management application may create and/or modify canonical resources on the remote computing device, and may cause the canonical resources to be associated with the paths and/steps. The use of canonical resources and canonical data types may allow for data consistency and consistent development and maintenance of APIs over time. The steps may define information necessary to accomplish a business goal, and the paths and/or steps may be associated with rules or other modules which may determine how the steps are displayed in the mobile computing device.

The workflows, or paths, may be portions of a business process that may require human interaction. For example, "collect user personal information" may be the business process corresponding to a step within a path. Human interaction may include collection of data, approval of information presented to the user, etc. A business process may comprise one or more workflows, and workflows may be reused and shared among business processes. The reusability of workflows and steps is a primary benefit of the methods and systems described herein. Workflows and steps may be reused across organizations that do not share common owners to build a consistent user experience. For example, a workflow may be used by two corporations A and B, wherein A and B have no common shareholders. Workflows may be deployed in applications, in production and/or development environments. A workflow, or path, may include state information and/or metadata. For example, each workflow may include a current step pointer, which corresponds to the step within the workflow that the user is in the process of completing. In an embodiment, each user may be associated with a list of step progresses, wherein the user's progress with respect to each step is included in the list of step progresses. A ratio of the number of steps that the user has completed to the total number of steps within a workflow may be computed by a workflow manager. A report may be obtained from the workflow manager specifying which steps are complete and the respective completion state of each one. Workflows may maintain step references, rules governing workflow version adoption, and workflow auditing requirements. Each step reference may refer to a step and upstream dependencies of a step. Each step reference may connect available step canonical properties to the business step parameters for a workflow. The information specified by the step reference may be used by a workflow manager to notify an experience manager to discover properties, and which properties should be discovered. Each step in the workflow may be associated with a step reference that represents the step. Workflow state may be captured in records known as interactions which may be associated with users. For example, state information with respect to a user's use of a credit card application workflow may be encapsulated into an interaction.

Paths, or workflows, may be executable (e.g., by a client application and/or server application) and may comprise a series of executable steps. Executable may indicate that the step is capable of being translated by a protocol handler into a form that accepts one or more user inputs, or that the step may be expressed in human-readable format, or that instructions within the step may be executed to cause an output to be produced. Steps within a workflow may be ordered by the sequence in which they are presented to the user, and may repeat (e.g., in a workflow execution loop). Steps may be shared between workflows to allow for modularity and creation of new workflows from existing steps. Workflow steps may obtain the information necessary to execute their business rules from business capability services (e.g., from APIs which provide information) or other locations (e.g., from a user). Steps may contain, or cache, data internally that may be necessary for their respective execution. Steps may be externalized (i.e., run in an external rule engine). Steps may be executed in parallel for performance reasons, and may be executed in multi-pass, and/or recursively. The execution time of steps may be tracked and traced for profiling or other purposes. Steps may or may not be individually secured components; therefore, the decision of whether or not a user is authorized to access a step may be made by a component separate from a step. Workflows and steps may be executed based on user roles—for example, a workflow may be executed differently depending on whether the accessing user is an agent, customer, or a customer service representative.

Steps may be reusable building blocks (e.g., "register a customer"). Generally workflows correspond to business processes, (e.g., "credit card application") and steps may encapsulate business rules which form part of the workflow (e.g., "collect applicant's home address"). A step may be an individual executable component of a path. Each step may maintain properties required for its execution and its current internal state. A step may be associated with a step type. Types of steps may include active state, address standardization, always complete, basic info, and others. In practice, steps may be implemented in any suitable manner (e.g., as Java classes deployed in a Jar file within an application). Steps may include or be associated with step parameters that may be linked to one or more canonical types, which may respectively correspond to the inputs accepted (and in some embodiments, required) by the steps.

In some embodiments, steps may include prerequisites. For example, a step in which a user submits a credit card application may not be able to be completed by a user until one or more prerequisite steps are completed. This order completion requirement may be enforced by a workflow, a step, and/or a workflow runtime (e.g., a workflow manager). Similarly, some steps may be optional, in that a user may not be required to complete them to proceed to a next step. For example, a workflow may comprise an optional "cross sell" step in which the workflow presents a user with an offer to purchase a related product, but the user's decision to reject, or not accept, the offer may not affect the user's ability to progress to the next step. The optionality and prerequisite nature of steps may be defined in workflow metadata. In this way, a given step may be optional in one workflow, but not another. In yet another embodiment, an optional step may become a required step based on information entered by the user. For example, entering information about the user's real property holdings may be optional, unless and until the user declines to enter information about the user's savings accounts. The business logic for implementing optional steps that become required may be stored within the step, according to an embodiment.

In yet another embodiment, a workflow may be used by an intake facility to digitize paper records. For example, information from a customer received via phone, agent office, mobile, and postal mail may be manually input into an appropriate workflow. The customer may then be sent a link to the workflow, and may resume working on an application with the information manually input pre-populated and available for the customer's inspection/verification. Manual input may also be used for the purposes of entering data into underwriting systems. In some embodiments, a user may switch between multiple input devices and/or protocols (e.g., from a cellular telephone to a voice-activated system) while remaining within the same workflow, and/or while interacting with the same step.

II. Example Environments for Generating and/or Executing Generic Dynamic UX Applications With respect to FIG. 1, an example environment 100 in which dynamic user experience applications may be generated is depicted, according to an embodiment. Environment 100 may include various client-side and server-side components; specifically, environment 100 may include a remote computing system 102 (equivalently "server 102", or, "server device 102") which may be coupled to a mobile computing device 104 (equivalently, "client 104", or, "client device 104") via a network 106.

Server 102 may be a single server or a group of multiple servers and multiple servers 102 may be deployed wherein each may be representative of a business API or service. Using multiple servers 102 may provide a number of benefits, including isolation between business APIs, isolation of production and testing environments, and greater availability and stability to each respective business API. Using multiple servers 102 may also provide the ability to independently tune and scale each business API, the opportunity to expose a more traditional API on a per-service basis, and may provide a business specific endpoint. Multiple servers 102 may provide tools and metrics that can be more easily aligned to business processes, and may provide each business API with the ability to be independently versioned giving consumers greater control over adoption and funding.

Alternatively, or in addition, server device 102 may be a multi-tenant device, wherein multiple business APIs may be implemented in a platform-as-a-service (PaaS) model. Advantages of implementing dynamic UX applications as PaaS may include more seamless sharing of resources between business APIs, quicker implementation of changes for multiple APIs (i.e., all instances may be changed simultaneously), and quick implementation of changes to shared resources between business APIs (e.g., business rules, common services, reusable workflow steps, etc.).

Server device 102 may include a processor 108, RAM 110, application storage 120 (e.g., one or more persistent memories), and application 122, which may include software instructions (e.g., a web stack, Android package, etc.). While referred to in the singular, processor 108 may include any suitable number of processors of one or more types (e.g., one or more central processing units (CPUs), graphics processing units (GPUs), etc.). Generally, processor 108 may be configured to execute software instructions stored in one or more memories (e.g., stored in a persistent memory such as a hard drive or solid state memory) of server device 102. RAM 110 may comprise solid state and/or transient memory and may store application storage 120, including instructions (e.g., corresponding to application 122). When processor 108 executes instructions corresponding to application 122, RAM 110 may, for example, temporarily store the instructions and data required for execution of application 122. Processor 108 may load instructions stored in application storage 120 or any other location into RAM 110. Software instructions, when executed by processor 108, may generate, create, and/or execute one or more dynamic UX applications, which may be loaded into RAM 110 or application storage 120.

Generally, server device 102 generates dynamic UX applications which may be accessed/utilized by client device 104, and processes user requests (also referred to herein as queries) generated by applications (e.g., application 168) in response to the user's use of those dynamic UX applications. Portions of the dynamic UX applications generated by server device 102 may be displayed on client device 104 (e.g., by application 168 and display 152).

In some embodiments, application 122 may be part of a larger application or set of applications. Application 122 may provide code and data (e.g., a dynamic UX application) to client devices. Code and data may include a fully-formed dynamic UX application, or requests/queries used to construct, modify, and/or view a dynamic UX application or portions of a dynamic UX application displayed in a client device. For example, server device 102 may generate web pages (e.g., Hypertext Markup Language (HTML) instructions, JavaScript instructions, Java Server Pages (JSP) instructions, mobile device application, and/or any other type of instructions suitable for defining the content and presentation of the code and data), and/or may include instructions of a plug-in, extension, and/or stand-alone software component that may be downloaded by client device 104.

Generally, server device 102 may provide users accessing application 122 with one or more user interfaces which may enable the users to interact with application 122, and which in turn, may modify data associated with server 102. To that end, server device 102 may transmit user interface (UI) components (e.g., style sheets, executable code, HTML or JavaScript widgets, etc.) to clients, which the clients may execute, and with which the respective users of those clients may interact. Those clients may transmit data back to server device 102 in the form of requests/queries, which may include data payloads.

Server 102 may also include data storage 124, workflow module 126, step module 130, and experience module 132. Server 102 may also include a communication interface 134 and a protocol handler 136, which, respectively, cause information to be transmitted to and from devices (including server 102) via network 106; and perform operations (translation, formatting, processing, etc.) on that information. The precise arrangement of the foregoing components may differ from that depicted in FIG. 1. For example, in some embodiments, step module 130 may be contained within data storage 124, or may reside in a separate server. In some embodiments, experience module 132 may be included in another server, in some embodiments, and an API may link experience module 132 to modules of server 102.

Data storage 124 may be composed of any suitable persistent or transient memory (e.g., a hard drive, random-access memory unit, etc.), and may store any number of modules including, without limitation, those depicted in FIG. 1. Data storage may include an electronic database (e.g. a relational database, key-value store, flat file, etc.) in which electronic records representing paths and steps may be stored, and associated. For example, a path may be stored in a one-to-one, one-to-many, or many-to-many relationship with one or more steps. A step may be stored in a similar relationship with respect to one or more canonical types. A user may configure and modify the respective relationships between workflows, steps, and canonical types using the methods and systems described herein.

Workflow module 126 may receive requests/queries, in response to which application 122 may take actions and issue responses. For example, workflow module 126 may advance the current step pointer from one step to another, for example, if workflow module 126 determines based on an analysis of the query that a step has been successfully completed. Workflow module 126 may communicate information to experience module 132. Similarly, workflow module 126 may terminate a given workflow, add a step to a path, create a path, associate one or more canonical types with a step, evaluate a step, etc. based on a respective instruction from application 122.

Generally, workflow module 126 may contain instructions for managing workflows, or paths. Workflow module 126 may include workflow metadata, such as a name, creation date and time, and unique identifier associated with each workflow. Workflow metadata may also include a list of steps associated with each respective workflow. Workflow module 126 may be communicatively coupled to a data store (e.g., an electronic database) in which workflows and steps are stored. Generally, step module 130 contains steps and instructions for executing steps. Step module 130 may include step metadata, such as a name, creation date and time, and unique identifier associated with the each step. Step metadata may include a list of workflows associated with, or which include, each respective step. Step module 130 may include, for each step therein, a list of inputs, and associated canonical types associated with each respective input.

Workflow module 126 may contain one or more workflows and may manage the execution of the workflows. Workflow module 126 may include a table of all workflows indexed by user or session, and their respective states. Workflow manager 126 may include a step with multiple resource types and steps may be executed as part of a workflow or individually. Steps may be associated with a user interface (e.g., a web form) and may log system activities (e.g., an audit log or information journal). Logging information may include debugging information (e.g., originating business context, etc.).

In general, any component may log information. For example, a user may be presented with a form that is part of a step by a client application, and may enter information into, and submit, the form. Completion of the step may require the user to enter data that the client may transmit via the application. The step may process the form and, optionally, make an entry in an audit system for audit purposes. In some embodiments, a step may process its input in a client (e.g., client 104). The same form may be re-used in case a user edits or verifies information displayed in a form. Then, the data the user entered previously may be sent to the step, which may pre-populate the form. However, in this case, the step may not be re-executed if the information has not changed (i.e., if the user does not change the information). Similarly, an audit entry may not be made if the step does not re-execute. Workflows and steps may both create audit records that may include a business context (e.g., the name of a referring agent). Workflow module 126 may determine the readiness of a step for execution in response to any new information workflow manager 126 receives.

While executing/processing a particular step, workflow module 126 may launch an external application. Workflow manager 126 may return the user to the executing step when the external application closes. For example, an application may receive a step generated by workflow module 126 that launches a PDF document in a PDF reader. Other examples may include launching external applications for electronic signatures, supporting documents, and customer searches. After reviewing the PDF document, the user may close the PDF reader and the application 168 may continue executing. In an embodiment, execution of the external program may not block execution of workflow module 126 (i.e., execution of external programs may be asynchronous with respect to the execution of workflow module 126). In an embodiment, workflow module 126 may support an event-based architecture, and may provide real-time notification of events to users. In some embodiments, the workflow module 126 may prevent step information from being stored, either temporarily or permanently.

Step module 130 may execute a series of steps in sequence for the performance of a task. For example, to complete a business workflow, step module 130 may execute steps 1-5 within a workflow, in sequential order. Execution of each step may include a response/request loop between a server (e.g., server 102) and a client (e.g., client 104), or a single computing device. The execution of each step may include one or more evaluations of user experience instructions located in experience module 132.

Experience module 132 may be a module that generates user experiences dynamically based on individualized UX rules defined by backend users, or generated according to an algorithm. For example, during the execution of a step by step module 130 or another module, a user of an application may be presented with a different experience based on information known about the user and/or the user's activity within the application.

In some embodiments, workflow module 126 and step module 130 may execute workflow and steps without any user experience whatsoever, to provide a user with what is, in effect, a purely "vanilla" or unstyled, or naïve experience. In other embodiments, an experience module 132 may be used which includes information about the customer and may personalize the customer's digital interactions with application 122 in much the same way that humans personalize human interactions with the same customers. It should be understood that the functioning of workflow module 126 and step module 130 may be entirely unchanged in the latter embodiment, because experience module 132 is able to enrich steps and workflows completely independently of the functioning of workflow module 126 and step module 130. That is, dynamic user experience information may be added by the use of experience module 132 without any changes to, or effect on, step module 130 and workflow module 126. To provide personalized experiences to the user, experience module 132 may fit the experience to the individual customer, determining how and when to display content based on the user's preferences, or profile. Determining how and when to display content may be based on a runtime determination of information associated with the user or a session associated with the user. Such determinations may be made based on trained machine learning models, in some embodiments.

Experience module 132 may create a user experience once, in the case of a standalone application 168 delivered to a user, or may do so on a continuous/on-demand basis for dynamic user experience applications in a server (e.g., application 122) or client (e.g., application 168). Experience module 132 may be implemented using a suitable application framework (e.g., Ember.js). A standalone application may be an application package file compatible with a mobile operating system such as Android or iOS.

Experience module 132 may create UX flows and request information from the user, and may send messages in canonical request format to protocol handler 136, which may in turn generate responses and send the responses to client 104. Experience module 132 may receive an indication of information source which indicates whether the information was directly entered by the user, discovered by a company service/source, retrieved from an external source (e.g., a vendor), or calculated (e.g., created by a business step). Based on the information source, experience module 132 may adjust the UX displayed to the user accordingly by, for example, presenting the user with an indication that the information was automatically populated, and encouraging the user to double-check or confirm the information. Such indications may take any suitable form (e.g., a textual message, the addition of color, the reordering of information in a table, etc.).

Experience module 132 may use information received from workflow module 126 to make UX flow decisions and to avoid problems (e.g., deadlocks). In an embodiment, experience module 132 may receive the number of steps that are remaining in workflow module 126, which have not yet been executed, and an indication of what the steps are. Experience module 132 may then determine whether to delay asking the user for information. For example, in some embodiments, another component (e.g., workflow module 126) may be unable to proceed without the information that experience module 132 wants to delay.

Experience module 132 may translate requests/queries for further information from the user made by workflow module 126 into an experience designed by experience architects. In an embodiment, behaviors and UX events may be stored within an interaction, wherein the interaction holds information about actions the user takes within the UI which can be used by experience module 132 to make decisions about which experience to deliver to the user in a given circumstance. Any user accessing application 122 may be provided with a different, or personalized, UX based on captured UX events, and other information. For example, experience module 132 may query another module for information which may be used to create a UX. Experience module 132 may learn another module that a particular user prefers a dark background in application A. Experience module 132 may then change the UX delivered to the user (e.g., a web application, standalone application, etc.) in application B to include a dark background. Experience module 132 may be associated with a content delivery network (CDN), UX rules database, and with one or more system of interaction electronic databases. Workflow module 126 may present the user with a UX that is obtained, in whole or in part, from experience module 132. For example, experience module 132 may include an intelligent agent which assists users in selecting auto insurance coverage. The selection of UI/UX components may be based on information experience module 132 may access regarding the workflow and user. The intelligent agent may prompt a first user to select coverage from a drop-down menu. The intelligent agent may prompt a second user to select coverage by manipulating a slider UI control. The choices of information may be the same or differ, but the presentation to the user may be personalized. The personalization (e.g., drop-down or slider) may depend on interactions that the first and second users have had previously with experience module 132. For example, in the past, a user may have responded more favorably to one UI control than another. Such favorable responses may have been captured by an interaction module or experience module.

In an embodiment, experience module 132 may include instructions that make UX decisions based on information needed by workflow module 126. For example, if only one step remains in a path, experience module 132 may provide an indication to user that the workflow is "almost complete!" A color or other visual indication may be used to denote that the path is nearing completion. In some cases, experience module 132 may adjust components used in the UI based on the confidence level of information collected. For example, if a user provides a telephone number that contains letters, then experience module 132 may show a UI control accentuated to designate the input as possibly invalid or suspect. Experience module 132 may make UX decisions based on the number of steps that are available for execution. For example, experience module 132 may display a different UI arrangement for a workflow comprising 25 steps than one that only contains two steps. For example, in the later example, the UX may consist of a single page, whereas in the former example, two or more pages may be used.

According to an embodiment, experience module 132 may use information collected during research to present an UX that is likely to cause users to complete workflows. Information collected during research may include, for example, user survey data, user facial analysis data, or other information regarding operation of one or more applications via one or more users. For example, research may indicate that a significant amount of potential customers halt their progress through an auto quote workflow when asked, early on in the workflow, for their social security number or other personal data. Experience module 132 may use this sort of finding to determine an optimal time to present or ask for a social security data (e.g., via a particular user interface) while another module returns data that may be useful in completing the quote as far as possible before the social security data may be needed. Additionally or alternatively, experience module 132 may determine an optimal manner of presenting or requesting particular information (e.g., whether to request/receive social security data via a visual data entry field, or via audio input/output). Although some of the foregoing examples involve varying UI controls within UX (such as sliders and dropdowns), other aspects of UX may also be varied. For example, the language of messages to the user may be changed, including slang and affectation, depending on user feedback.

Protocol handler 136 may receive requests/queries from clients. Protocol handler 136 may examine requests, determine if each request is associated with a user or session, and if so, whether the user/session corresponds to an existing user/session. Sessions may be stored in a database communicatively coupled to server 102, or client 104. Protocol handler 136 may determine a network protocol and sub-protocol associated with a request, and may route the request to the workflow module 126 or another module, which may cause workflow module 126 to begin executing a workflow at a position (e.g., at a step). The position may be specified by a request, or may be associated with a user/session. In general, requests may be received by protocol handler 136 and responses may be sent by protocol handler 136. As used herein, the term "request" generally refers to an electronic request object that represents an exchange of information between a user and an application via the network 106. The terms "user request" and "request" may be used interchangeably. Requests and responses may be transferred between server 102 and clients (e.g., client 104) via a common data interchange protocol (e.g. via a representational state transfer (REST) API or a proprietary data interchange protocol. While some of the examples herein refer specifically to requests and responses pertaining to, for example, credit card and auto insurance applications, it should be appreciated that the techniques described herein are applicable to many other types of applications. For example, a gaming application created for a mobile device may support its own form of user requests and responses.

In some embodiments, requests are stateless, and in others, requests may have state. A request may be user-initiated, wherein the request is based on, or generated in response to, a direct or indirect user action. For example, a user of a user device (e.g., server 102 or client 104) may perform a click event on a form submit button using a peripheral device, or may make a selection via a capacitive touch screen, or perform any other suitable action indicating an initiation of a request. Instructions executing in the user device may process the user selection or event and, in response, generate and transmit a request (e.g., via network 106). It should be noted that in some embodiments, the user device and the remote computing system may refer to the same device (e.g., server 102), and that in other embodiments, the user device may be a client device (e.g., client 102) linked to the remote computing system via an intermediate wired and/or wireless network.

A request may include an operation, wherein the operation may include creating, retrieving, updating, and/or deleting one or more paths and/or steps. For example, the user may initiate a "CREATE" operation with respect to a path. To do so, a user may be required to enter path information by, for example, typing or otherwise entering information into a form fieldset. The operation and path information may be included in the request, and may be evaluated by workflow module 126. Executing, or evaluating, the request may include mapping the operation (e.g., UPDATE) to a corresponding method of one or more of a plurality of electronic database systems, and depending on the request type, executing the request may include providing the method with one or more evaluation parameters, which may correspond to information in the request (e.g., a path ID, step ID, user ID, etc.).

Similarly, requests may include information entered by a user during the execution of a dynamic user experience application accessed by a user. A user may access application 168, and by utilizing various functionality of application 168 (e.g., by selecting a user interface widget) may cause application 168 to issue requests and receive responses. For example, a user may enter information into a form, and press a "submit" button, which may cause the information to be transmitted and/or processed. In this case, the request may not include information modifying, deleting, or creating a step or workflow, and may only contain the information that the user entered.

More than one protocol handler 136 may be configured, and protocol handler 136 may be integral to a client and/or server in environment 100. As stated, protocol handler 136 may receive a user request in response to behavior and events of a user (e.g., a mouse click or another event). Further, code executing in a client may cause user requests to be sent to server 102, and may receive responses, potentially unbeknownst to the user. Requests may be sent by client 104 synchronously or asynchronously with respect to the execution of code in client 104. As noted, in addition to translating requests between clients and applications, protocol handler 136 may route requests to application 122 components, and may also provide other modules with information pertaining to the capabilities of client devices. If a request type corresponds to a workflow initiation or resumption, then protocol handler 136 may route the request to workflow module 126. Upon receiving a request, workflow module 126 may determine whether to resume an existing interaction or begin a new one based on the request contents. Workflow module 126 may determine whether an interaction already exists by analyzing an indication and/or metadata from client device 104 (e.g., a UUID and/or an HTTP header). If an existing interaction is to be used, then workflow module 126 may retrieve the existing interaction. If a new interaction is to be used, then workflow module 126 may initiate a new interaction. It should be noted that a user may also decide to cancel or terminate a workflow. Also, a step may contain logic that causes a workflow to terminate if a certain condition is met, or if a particular input is provided to the step by a user (e.g., by a user of client 104). In some embodiments requests and responses may be respectively handled and issued by client device 104, either exclusively or in combination with server 102.

Server 102 may also include a display device 138 and an input device 140. Input device(s) 140 may include components that are integral to server 102, and/or exterior components that are communicatively coupled to server 102, to enable server 102 to read/retrieve inputs from the user via input device 140. For example, input device(s) 140 may include a mouse, a keyboard, a trackball device, a microphone, scanner, etc. Display device 138 may also be either integral or external to server 102, and may use any suitable display technology (e.g., LED, OLED, LCD, etc.). In some embodiments, input device(s) 140 and display device 138 are integrated, such as in a touchscreen display. Generally, input device(s) 140 and display device 138 combine to enable a user to interact with user interfaces provided by server 102, for example, user interfaces included in, or provided by, application 122.

Client 104 may be any suitable user device (PC, notebook, laptop, desktop, smart phone, or tablet) and may run any suitable operating system. Client device 104 may include one or more client user interfaces (UIs), which the user may access and interact with (e.g., via any suitable web browser). Client UIs may include software (e.g., a dynamic UX application UI including a UI web application and/or model, a UI control library, etc.) owned or controlled by the company or entity operating server 102, and the client UIs may be served to mobile computing device 104 via network 106 from remote computing system 102 (e.g., over HTTP). The client UIs may be implemented as standalone applications (e.g., as Android application packages (APK)) or as executable web code (e.g., HTML, JavaScript, and CSS). In some embodiments, a client UI may be a hybrid of application package code and executable web code. A client such as client 104 may also be referred to as a "user device".

While FIG. 1 depicts only a single client device 104, it is understood that multiple different client devices (of different entities and/or users), each similar to client device 104, may be in remote communication with server 102. Further, multiple client devices 104 of different types, which may correspond to different user cohorts, may access server 102. For example, in some embodiments, server 102 may accept requests from clients which, respectively, include backend, or administrative, users. Such users may be employees or agents of the proprietor of the methods and systems described herein, and may use client 104 and the services provided by server 102 for the purpose of defining and administering workflows/paths, steps, canonical types, and other operations (i.e., to create dynamic user experience applications for use by other users) as described above.

In the embodiment of FIG. 1, client device 104 includes an input device 150 and a display device 152. Input device(s) 150 may include components that are integral to client device 104, and/or exterior components that are communicatively coupled to client device 104, to enable client device 104 to accept inputs from the user. For example, input device(s) 150 may include a mouse, a keyboard, a trackball device, a microphone, scanner, etc. Display device 152 may also be either integral or external to client device 104, and may use any suitable display technology (e.g., LED, OLED, LCD, etc.). In some embodiments, input device(s) 150 and display 152 are integrated, such as in a touchscreen display. Generally, input device(s) 150 and display 152 combine to enable a user to interact with user interfaces provided by client device 104, for example, client UIs.

Client device 104 may also include a processor 160, a random-access memory (RAM) 162, a communication module 164, and an application storage 166. Application storage 166 may include application 168. Client device 104 may also include a data storage 170 and a camera 172. Processor 160 may include any suitable number of processors and/or processor types. Processor 160 may include one or more CPUs and one or more graphics processing units (GPUs), for example. Generally, processor 160 may be configured to execute software instructions stored in application storage 166 (e.g., client UIs in application 168).

Application storage 166 may include one or more persistent memories (e.g., a hard drive and/or solid state memory), and store a number of applications including, for example, a web browser application implementing application 168, in an embodiment. Application 168 may be a web application, or an application of a different type, such as a standalone executable, distributed mobile application, etc. Data storage 170 may include one or more persistent memories, and generally stores data used by applications stored in application storage 166. For example, data storage 170 may store local copies of steps or other code/data downloaded from server device 102.

Data stored in application storage 166, application 168, and data storage 170 may be loaded into RAM 162 when processor 160 executes instructions stored in application storage 166. Instructions implementing application 168 may be downloaded to application storage 166, and when processor 160 executes application 168, for example, RAM 162 may temporarily store the instructions and data required for its execution while application 168 displays the dynamic UX application on display 152 or otherwise operates on the dynamic UX application. When the user of application 168 uses application 168 to access server device 102, scripts, applications, and/or other instructions of server device 102 (e.g., instructions associated with workflow module 126 and step module 130) may be stored as local copies in RAM 162. Application 168 may load components and data from remote computing system 102, such as user interface components, and application data, into RAM 162, and may store such components and data locally (e.g., in data storage 170). Data storage 170 may include persistent or transient storage devices, including magnetic and/or solid-state storage devices.

Mobile computing device 104 may transmit user requests to remote computing system 102 via network 106. Requests may include data and metadata indications (e.g., a universally unique identifier (UUID) or other identifier), and may be triggered by a user action (e.g., via a user interaction with input device 150) or by the occurrence of a condition (e.g., code in application 168). A request or query may include an indication of one or more workflows/paths, and or associated steps. A request may include a tree data structure, wherein each workflow, or path, is a node comprising a plurality of other nodes and/or leaves (i.e., leaf nodes). A leaf node may be a node with no children, or a node with no back links. A node may represent a path, a step, or a sub-step (e.g., a step that includes additional steps). The entire tree of nodes may be downloaded from server 102, modified in client 104, and then uploaded to server 102. In some embodiments, a tree may be a specific type of tree, such as a binary tree, red-black tree, etc. When a path including steps is evaluated, evaluation may proceed according to a modified breadth-first search or depth-first search algorithm, or another tree-traversal algorithm.

In some embodiments, a client application (e.g., client 168) may modify the state of paths and steps within the overall system. Further, client device 104 may decorate requests with an indication of the type of request. For example, the request may be designated as a business resource request, a user information request, a workflow information request, a behavior and UX event, etc. Communication between client device 104 and server device 102 may be implemented using a secure transfer protocol such as HTTPS.

In operation, a backend user may open application 168 in a web browser or as a standalone application (e.g., in a mobile device, laptop, etc.). The user may be presented with a list of paths and steps, which may be pre-loaded into the application 168, or retrieved via communication module 164, network 106, and communication interface 134. The list of paths and steps may be presented to the user in any suitable format, and may be retrieved by the user submitting a request to a remote computing server, such as server 102. The request submitted by the user may include an indication of one or more paths, and the remote computing system may select a set of active paths and respective associated steps based on the indication of one or more paths. The indication of one or more paths may be a simple list of identifiers corresponding to a path, such as integers, or a more complex indication, such as a nested structure. The set of active steps may be transmitted to a user device, wherein the user device is a client device other than the remote computing server, or wherein the user device is the remote computing server. That is, the user may be using the remote computing server directly by input and display devices directly coupled to the remote computing server, such as via display device 138 and input device 140, or indirectly, via a client device and network, such as mobile computing device 104 and network 106.

In some embodiments, paths may be stored in a tree wherein the nodes of the tree correspond to paths and the leaves of each node represent sub-paths, and wherein each path includes one or more steps that may themselves be arranged in a tree, according to some embodiments. Path and steps may be transmitted to the user device as described above in a nested data structure, such as a hash map or any other suitable data structure which allows a hierarchical arrangement of paths with respect to steps to be preserved, and processed/displayed by a client application, such as application 168. Path and steps information may be presented to the user in display 152 and the user may be able to select a path or a step within a step. Selection of a path or step may cause execution of the path/step to begin.

In an embodiment, a first set of paths, each associated with a respective first set of one or more steps may be received in a user device, wherein each is associated with a respective first set of one or more steps. The user may select one of the paths. In response to the user's selection of a path, the path may execute the steps associated with the path. In some embodiments, the user may select a path and may be redirected, by a workflow manager, to a step that is in the middle of the path; i.e., a step that is not the first step in the path. Such redirection may be the result of the user's having already completed one or more steps within the path, and the step that the user is redirected to may be the first uncompleted step in the path. Execution of a path or workflow may include recursive execution of all steps within that path, in addition to resolution of dependencies between steps.

Steps may include step logic, or rules, which the user may enter as a group of parameters, operators, and operands. The step logic may be executed at the time that the step is executed, to validate, transform, or process inputs. A step may return one or more values to a code or application executing the step. A step and the step's one or more respective step operators and step operands may be associated together in an electronic database. Relationships between steps may be defined, such as the hierarchical ordering of steps within a path tree, in some embodiments, or the linear ordering of steps in some other embodiments. The user may define dependencies between steps, in that a step A must be presented to the user, and valid output obtained, before a step B may be presented to the user. Such dependence may be represented using an appropriate data structure (e.g., a stack or an acyclic graph/tree), in an electronic database or in a memory such as data storage 124.

A step may have a default (e.g., vanilla) user experience with which to associate a path and/or one or more steps within the path. Available user experiences may be published by experience module 132, and may specify both the look and feel, ordering and arrangement, and tone/content of information delivered to users via the execution of steps within a path. Multiple versions of paths and steps may exist, which may be executed at different times, based on conditional criteria (e.g., the identity of the user, the time of day, randomly, according to a schedule, etc.). In some embodiments, technical users may construct steps, and non-technical users may build paths. In some embodiments, paths and steps may include logic preventing information from one business unit from being accessible in another, due to regulatory and or legal/compliance issues.

It should be appreciated that in some embodiments, the user interface components displayed to users are completely uncoupled from the paths and steps represented by the user interface components, in that a user never specifies whether a particular step will use, for example, a drop-down list in HTML to solicit a user selection. Rather, a step may require a user selection from a list through the administrative user interface application 122, and another component (e.g., experience module 132) may determine the graphical user interface component(s) that will be used to accomplish the collection of the needed information, at the time the step is executed. Not only may the controls be subject to runtime determination by experience module 132, but also the ordering and frequency of information collection may be determined by experience module 132.

Network 106 may provide connectivity between server 102 and client 104, in some embodiments. Network 106 may be a single communication network, or may include multiple communication networks of one or more types (e.g., one or more wired and/or wireless local area networks (LANs), and/or one or more wired and/or wireless wide area networks (WANs) such as the Internet). Server device 102 may be accessible by multiple networks, for example by a company intranet and the Internet. Customers may be granted access to a portion of server device 102 (e.g., a bank credit card application) via the internet, whereas business partners, agents, and employees of the proprietor of server device 102 may be granted broader, or narrower, access to portions of server device 102 (e.g., to a path editor or experience editor). Access to additional services may be similarly granted or restricted by the proprietor of server device 102 on any suitable basis.

Figure 2:
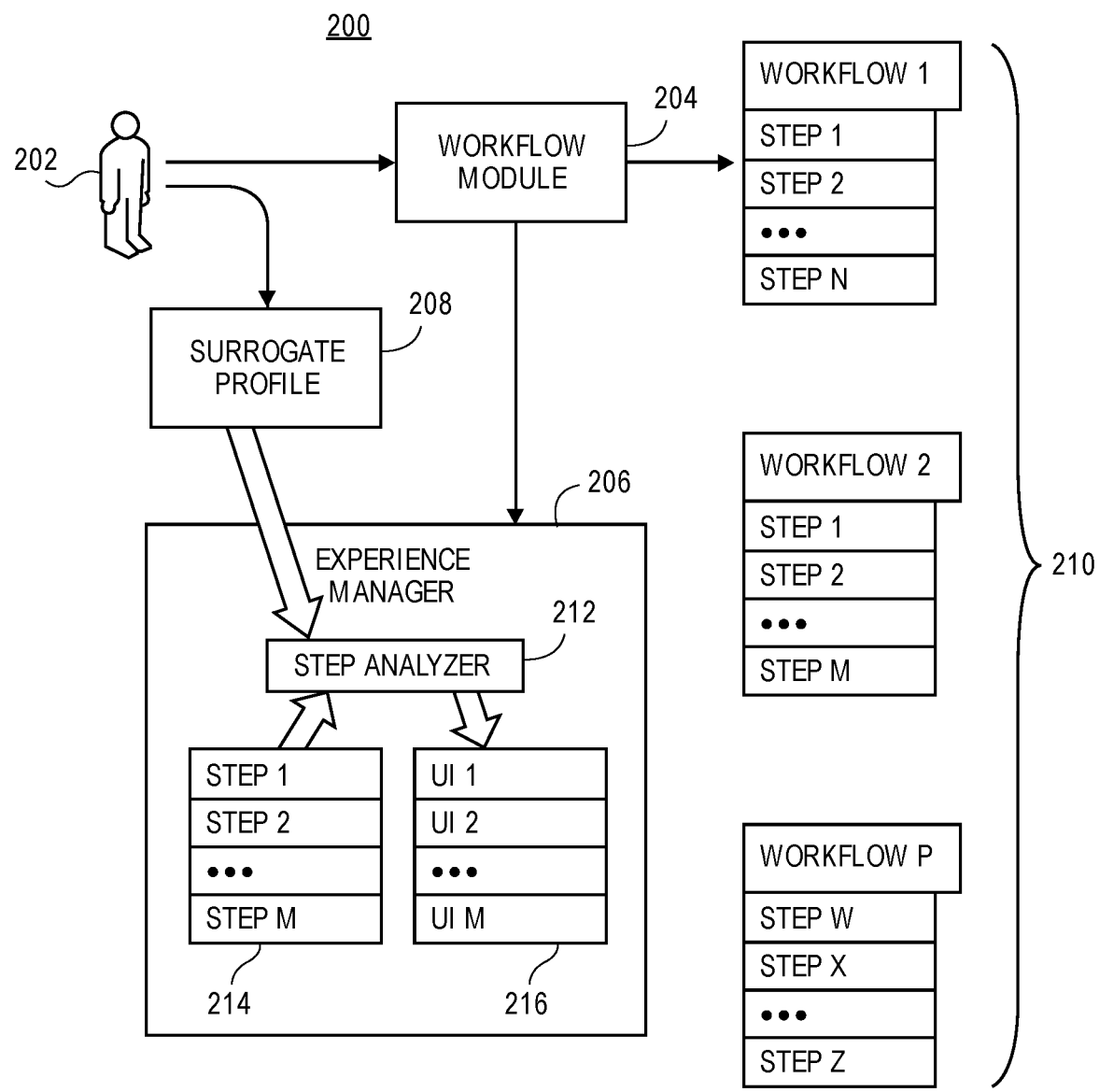
FIG. 2 depicts an example flow diagram for executing dynamic UX applications, in accordance with some embodiments.

With regard to FIG. 2, an example flow diagram 200 for executing workflows within a dynamic UX application is depicted, according to an embodiment. Flow diagram 200 may include a user 202 who may correspond to a user of mobile computing device 104, a workflow module 204 which may correspond to workflow module 126, an experience manager 206 which may correspond to experience module 132, a profile 208, a series of workflows 210, and a step analyzer 212 which may correspond to step module 130. Experience manager 206 may include a list of steps 214 which may correspond to a workflow, and a list of user interfaces 216 each of which may correspond, respectively, to list of steps 214. In an embodiment, step analyzer 212 may execute each step in list of steps 214, and may decorate each step with dynamic user experience information during the execution (e.g., while generating HTML). In another embodiment, step analyzer 212 may receive an already-executed step from workflow module 204, and may decorate the output of the step (e.g., by parsing HTML contained therein). In some embodiments, list of user interfaces 216 may be transmitted, one step at a time, to user 202 as each step is executed by step analyzer 212. In other embodiments, list of user interfaces 216 may be transmitted to user 202 as a whole, after all of list of steps 214 has been executed.

In operation, user 202 may open or access an application such as application 122 or application 168. Such an application may receive or retrieve a list of workflows, such as workflows 210. As in the depicted embodiment, workflows 210 may include a number of workflows 1, 2, . . . P, wherein P may be any integer. Each of respective workflows 1–P may include any number of steps, which may or may not be identical as between workflows. For example, as depicted, workflow 1 may include steps 1, 2, . . . N; workflow 2 may include steps 1, 2, . . . M; and workflow P may include steps W, X, . . . Z. In this example, steps 1 and 2 may be the same step both used in workflows 1 and 2, and N and M may be any integers. Steps W, X, and Z may be steps unique to workflow P. User 202 may select workflow 2, which may correspond to a particular activity, or business process, such as "apply for a new credit card". Such a selection may be made via any suitable means (e.g., by activation of a link, or UI control) as discussed with regard to FIG. 1. Selection may cause a request to be made, in some embodiments, from a client device to a server device. The request may be received in the server and may cause execution of a first step in a workflow to begin. Execution of a first step may be based on a session of the user. As noted above, a "first step" may be the first step in a sequence, or the first uncompleted step (e.g., a step at any sequential position in a path). For example, the request may include the ID of a workflow (e.g., 2) which workflow module 204 may use to retrieve a workflow. The list of steps in the retrieved workflow may then be analyzed by workflow module 204 to determine the appropriate step for execution. The list of steps in the retrieved workflow may correspond to list of steps 214, and may be transmitted to experience manager 206 by workflow module 204. Profile 208 may include information pertaining to, or related to, a user. For example, demographic information about the user (e.g., age, location, occupation, etc.) may be included. Profile 208 may also include use pattern information. For example, information related to the user's use of a client or server included in the system (e.g., server 102 and 104) may be included in profile 208. Demographic and usage pattern information may be used by step analyzer 212 to determine and/or generate the user interfaces in list of user interfaces 216. List of user interfaces 216 may compose or comprise a dynamic UX application, in some embodiments.

Execution of list of steps 214 may be performed by step analyzer 212. An internal pointer may be analyzed to determine which step to execute first, and/or the state of each step may be analyzed by step analyzer 212 to determine which steps are eligible for execution. As discussed above, in some embodiments, steps of a certain type may be executed last (e.g., steps which ask for highly personal information, such as social security numbers). In some embodiments, the timing of execution of steps which require highly personal information may be affected by the type of workflow (e.g., by being deferred). For example, in a home loan workflow, highly personal information may be requested first, whereas in an auto loan workflow, highly personal information may be requested last. The timing of execution may be determined by user experience rules associated with experience manager 206, wherein such rules are executed by step analyzer 212. Step analyzer 212 may determine information about the user by receiving or retrieving information from profile 208. In an embodiment, information contained in a session associated with a user may be used to determine the current, next, and/or previous step.

Figure 3:
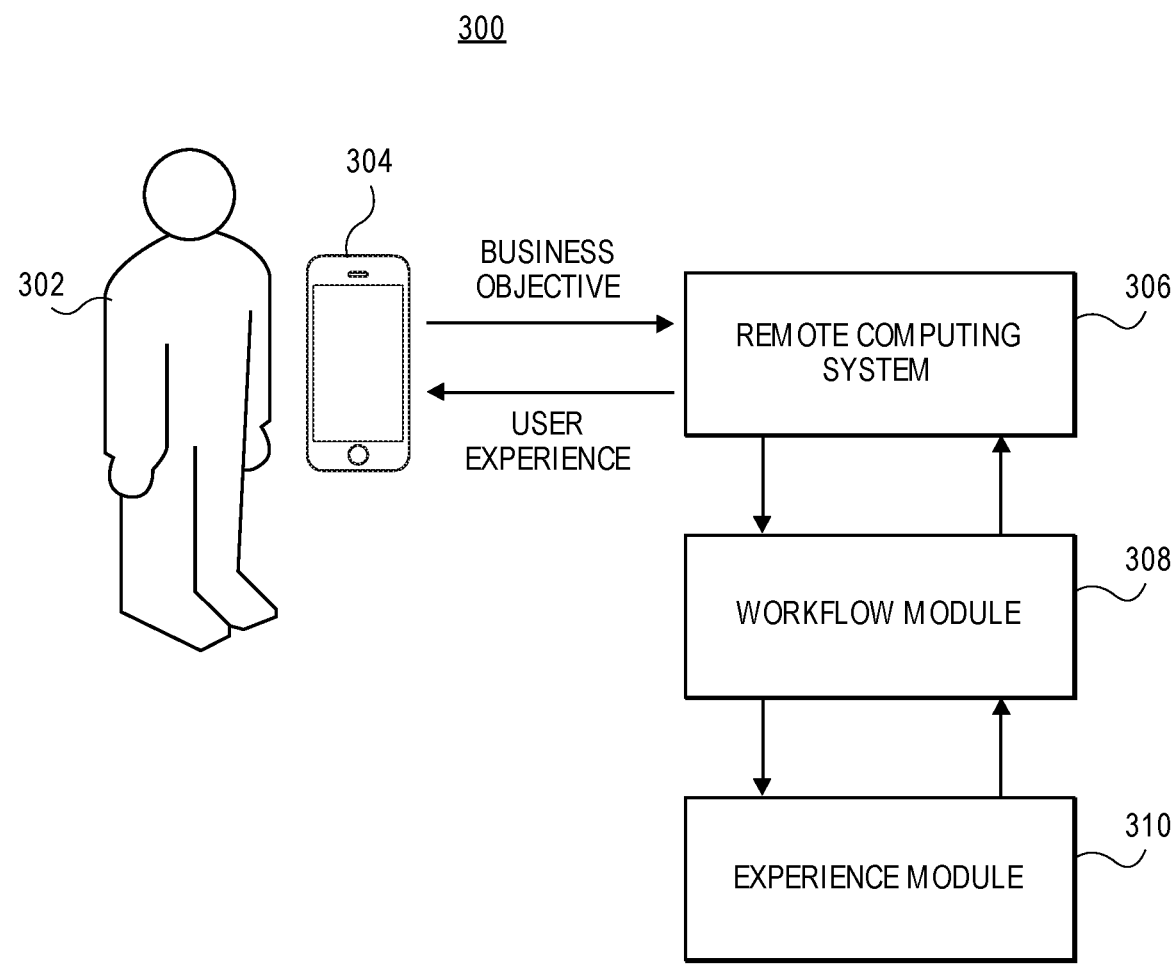
FIG. 3 depicts an example data flow diagram for implementing dynamic UX applications, in accordance with some embodiments.

Turning to FIG. 3, an exemplary data flow diagram environment 300 for generating dynamic UX applications, is depicted, in accordance with an embodiment. Environment 300 may include a user 302, user device 304, and remote computing system 306, which may correspond, respectively, to user 202, mobile computing device 104, and remote computing system 102. Environment 300 may include a workflow module 308 and experience module 310, which may respectively correspond to workflow module 204 and workflow module 126, and experience manager 206 and experience module 132.

In operation, user 302 may open or access an application in user device 304. User 302 may have a particular business objective in mind while doing so. For example, user 302 may be seeking a loan. Business objective of user 302 may be transmitted from user device 304 remote computing system 306 via a request object, as described above. In some embodiments, user device 304 may be the same device as remote computing system 306. Remote computing system 306 may transmit the received business objective to workflow module 308, wherein one or more workflows corresponding to the business objective may be selected. For example, a business objective may include a search term such as "loan" and workflow module 308 may return a list of workflows which match the search term (e.g., auto loan, home loan, personal loan, etc.). The list of workflows may be passed to experience module 310, where they may be personalized in accordance with preferences of user 302, as described above, to create a dynamic user experience. As described above, the workflows may be encapsulated in an application container, or served to user 304 via a web server (e.g., as Java server pages, HTML, etc.). Each dynamic user experience may be transmitted back to user 304 by way of workflow module 308 and/or remote computing system 306. User 302 may interact with the user experience delivered by environment 300 in furtherance of the business objective.

Figure 4:
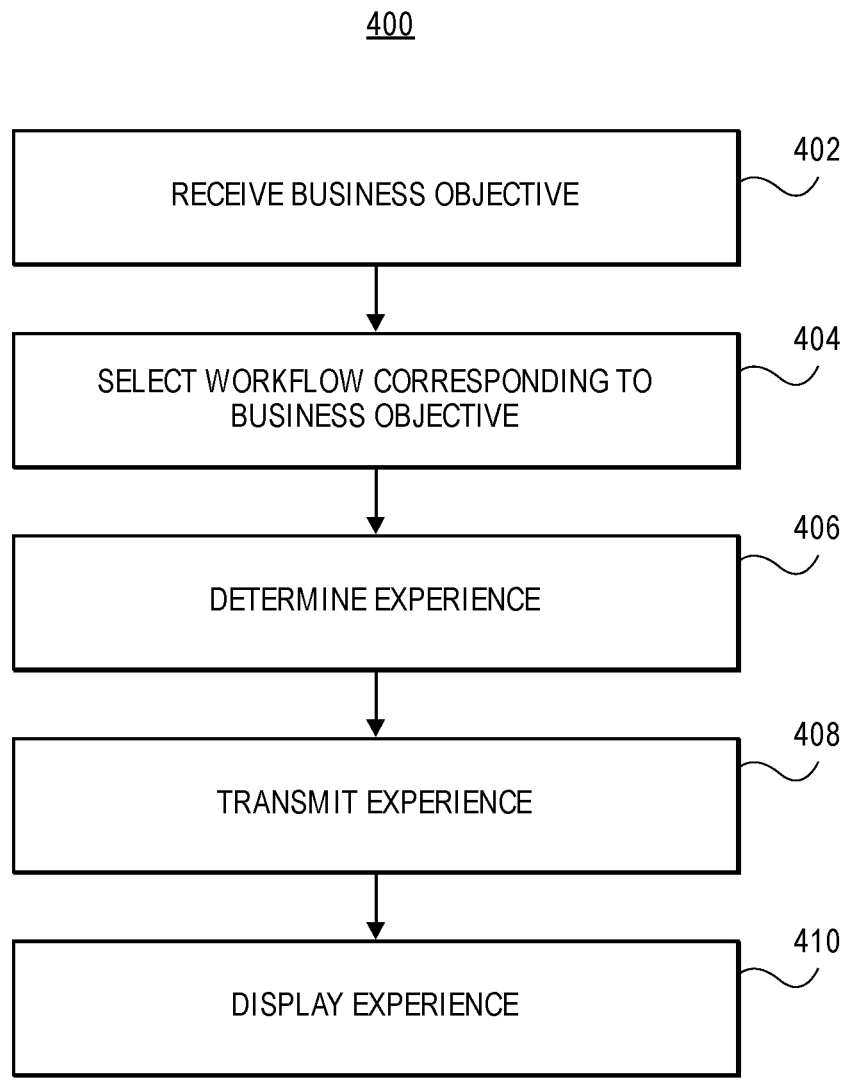
FIG. 4 depicts an example method of generating dynamic UX applications, according to an embodiment.

With regard to FIG. 4, a method 400 of generating a dynamic UX application is depicted, according to an embodiment. Method 400 may include receiving a business objective (block 402). The business objective may include a search phrase, such as "credit card". Alternately, the business objective may be determined with respect to an existing product (e.g., "increase liability coverage"). The business objective may be selected from a pre-existing list that is received by a user device such as user device 304, or may be user-directed (e.g., a search term or phrase). Method 400 may include selecting one or more workflows, or paths, corresponding to the business objective (block 404). For example, a user whose selected business objective is "decrease monthly premium" may cause a plurality of related paths to be selected, wherein each path respectively consists of multiple steps designed to reduce the user's monthly premium in a plurality of respective categories. For example, "reduce auto premium", "reduce home premium", and "apply discounts" may be three respective workflows corresponding to a single "decrease monthly premium" business objective. It should be appreciated that many more examples are envisioned. Method 400 may include determining, or generating, an experience with respect to one or more of the selected workflows (block 406). As described above, determining/generating an experience may include an experience module such as experience module 310, experience manager 206, or experience module 132 executing one or more UX rules, and may also (or alternately) include examination of a user's prior use patterns and/or expressed preferences. Determining/generating an experience may include analyzing the protocol of the user's device. For example, the provided UX may differ based on whether the user is utilizing, for example, short message service (SMS). Similarly, determining/generating an experience may include analyzing the device capabilities of the user device (e.g., the screen resolution, network connectivity, available memory, etc.). Method 400 may include transmitting the generated UX to the user, and/or the user's device (block 408). In some embodiments, the entire method 400 may be implemented in a single user device, and as such, transmission may be performed via a local loopback networking device, or via shared memory. In other embodiments, transmission may be performed via a wired or wireless network, such as network 106. It should be appreciated that in some embodiments, the dynamic UX application may be pre-compiled and delivered to the user as a standalone executable. In other cases, the dynamic UX application may execute in a runtime, and portions of the application may be transmitted to the user in a request/response cycle via a network. Depending on the particular embodiment used, transmission patterns may differ. Method 400 may include displaying the dynamic UX in the device of a user (block 410). Displaying the device may, as noted above, be performed by painting an output display device, such as display device 138 or display device 152. In some embodiments, "display" may connote portions of responses being played back via a sound card and audio speakers integral to, or communicatively coupled to, a computing device of a user. That is to say, the "display" of information may differ, depending on the protocol and hardware the user utilizes to access the dynamic UX application. Protocol handler 136 may have built-in facilities for translating user experiences generated by user experience modules into the appropriate display format. In some embodiments, displaying the dynamic UX may include delivering hypertext and other multimedia sources/instructions to a browser or application executing in the data storage of a user device, such as application storage 166, and such execution may be performed by a processor (e.g., processor 160). In some embodiments, dynamic UX instructions may take the form of styling and behavior instructions implemented in, respectively, cascading style sheets (CSS) and JavaScript.

III. Example Environments for Validating and Completing Workflows and Steps

Figure 5:
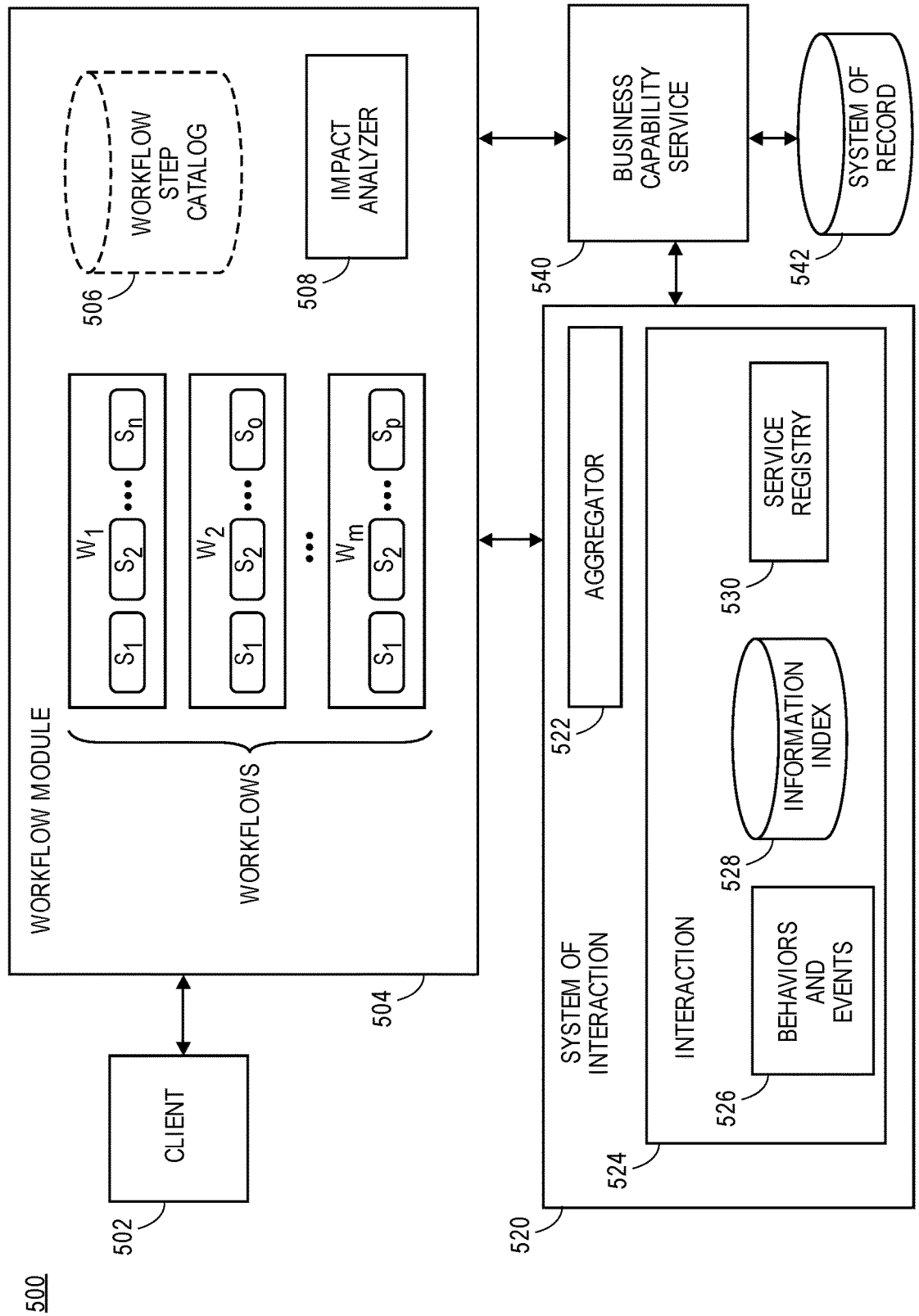
FIG. 5 depicts an example environment for implementing workflows and steps in a dynamic UX application, in accordance with some embodiments.

Turning to FIG. 5, an exemplary environment 500 for validating and completing workflows and steps in a dynamic UX application is depicted, in accordance with some embodiments. Environment 500 may include a client 502 which may correspond to mobile computing device 104 and/or client device 304. Environment 500 may include a workflow module 504 which may correspond to workflow module 126, workflow module 204, and/or workflow module 308. Environment 500 may further include a system of interaction 520, a business capability service 540 and a system of record 542. System of interaction 520 may be integral to an experience manager, such as experience manager 206, according to some embodiments. Workflow module 504 may include workflows $W_1$-$W_m$, wherein m is any integer, and which may respectively contain steps $S_1$-$S_n$, $S_1$-$S_o$, and $S_1$-$S_p$ wherein n, o, and p may be any integers. That is, the steps in workflows $W_1$-$W_m$ may respectively include any number of steps. The steps may be ordered. However, it should be noted that the number of steps per workflow may differ. Therefore, in the depicted example, the indices n, o, and p may differ, in addition to the identity of the steps composing each respective workflow. Further, no two steps at the same position within a workflow may necessarily be the same (e.g., $W_1S_1$ and $W_2S_1$ may differ). Workflow module 504 may include workflow step catalog 506 and impact analyzer 508, which may correspond to step analyzer 212. Workflow step catalog 506 may be an electronic database which may or may not be integral to workflow module 504. For example, in some embodiments, workflows step catalog 506 may be a remote database communicatively coupled to a device in which workflow module 504 is included, via a network. Impact analyzer 508 may determine what information the workflow currently has, and what additional information may be required to complete the workflow. For example, impact analyzer 508 may determine available information (e.g., username, client ID, and level of assurance) and additional required information. Impact analyzer may determine which additional information is required by accessing system of interaction 520.

In an embodiment, workflow module 504 may load a workflow by a name provided in a uniform resource identifier (URI). The workflow may comprise a list of step references. Workflow module 504 may hydrate the workflow by instantiating an instance of each step reference in the workflow. Workflow module 504 may load step classes from step catalog 506. As workflow module 504 instantiates each step reference, workflow module 504 may associate the instantiated class with the respective step reference in the workflow being hydrated. The hydrated workflow may then be passed to a runtime. Steps may be annotated with canonical resource and type information as they are instantiated.

In some embodiments, the additional required information determined by impact analyzer 520 may be grouped by step. For example, in a credit card application workflow, the impact analyzer 508 may determine that the workflow includes the following steps and respective required information:

| Step | Required Information |
| --- | --- |
| Primary Applicant Basic Client Data | Name, Home Address |
| Primary Application Expanded Credit Card Client Data | Birth Date, Social Security Number |
| Primary Application Basic Income | Gross Income |
| State Activation Lookup | State of Residence |

Impact analyzer 508 may cause workflow module 504 to modify the ordering of steps within the workflow, or to move the current step pointer to a particular step in response to missing information, or in response to a question in a step being answered in a specific way, or in response to a user-initiated event. For example, impact analyzer 508 may cause workflow module 504 to redirect the user to a step that indicates that the workflow is unable to continue the steps because the step needs missing information from the user. Once the user provides the additional information that is required, by sending a response received by workflow manager 304, impact analyzer 308 may analyze what steps can be executed with the new information.

Impact analyzer 508 may query information index 528. Information index 528 may be a data store that persists the information that is collected from the user or by system of interaction 520 on the user's behalf during an interaction. Similarly, impact analyzer 508 may transmit information to system of interaction 520 for storage and future use, including during the life of the interaction.

In an embodiment, impact analyzer 508 may query aggregator 522 for relevant business capability information. Aggregator 522 may more granularly determine, based on the required information, what information is available from various data sources (e.g., both internal and external data APIs) and how that information may be obtained. For example, aggregator 522 may collect information required by workflow steps using information available in information index 528 as well as information available by calling, for example, business capability service 540 or external vendor services. To retrieve information from business capability service, aggregator 522 may use information contained within information index 528 in conjunction with service registry 530 to determine what services can be called to retrieve the required information.

Aggregator 522 may gather information needed by workflow steps from service registry 530 based on information from information index 528 without requiring additional user input. Service registry 530 may use an algorithm (e.g., a best fit analysis algorithm) to select a service that can be called by the aggregator 522 that provides the most optimal access to the information. Under certain business circumstances, information should not be able to be received from aggregator 522 even if it is available. In that case, the information may be required to be retrieved from the customer, if at all. Some information may be discoverable in some contexts via aggregator 522, but required to be elicited from the customer in others.

Data pertaining to users may be collected by aggregator 522, and a user may only be prompted to provide information that is required. For example, system of interaction 520 and/or aggregator 522 may determine that the following user information exists in the information index with respect to user Jane Smith:

| Name | Residence | Email | Phone | SSN | Employer | Income |
|---|---|---|---|---|---|---|
| Jane Smith | 1600 Pennsylvania Ave. | jane@example.com | 555-1234 | 123-45-6789 | — | — |

In this case, the missing information includes employer and income. For example, employer may be required, and income optional. Then, the user will be only prompted for employer, or may be prompted to supply both but a UI control may be accentuated to indicate to the user that income is not required information. In an embodiment, resource types may be included in information index 528. Steps may be required to verify that information passed to them is of the correct type, and they can use resource types for that verification. Steps may also need to access interaction metadata. In an embodiment, workflow module 504 may include a workflow W. The workflow may include instructions which cause the workflow manager to look up and invoke services when workflow W is executed. In some embodiments, workflow W may specify only which data is needed, but not which services are to be used to obtain that data. Therefore, workflow creators may create workflows and reference business data elements without needing to have specific knowledge of where that data will ultimately be sourced from, or where that data needs to be stored.

In general, workflows may be granted access to business context, and such context may be incorporated into the execution of steps within the workflow. For example, a business context may include the yearly fee of a credit card. As the steps in the workflow execute, they may make reference to the yearly fee via the business context. If the yearly fee changes, then the fee may be updated for the steps using the context.

In operation, a user of client 502 may click on a link (e.g., a credit card application link) or activate another suitable user interface element. In response to the activation, a request may be generated by way of a protocol handler. The protocol handler may implement a JSON API (e.g., Katharsis) that maps requests to resources (e.g., java classes). The resource(s) may call workflow module 504, and workflow module 504 may process the request and return a response. For example, java classes representing resources may be implemented as:

Ccapp.java
@JSONAPI Resource (type="ccpapps")
data attributes of cc, address, name, etc
class ccapp{
ccapp repository.java
@JSONAPI resource repository (CCApp.class
  class ccApp . . .
  findAll
  findone
  saveC
  delete The functions in the resources may invoke workflow module 504 by passing a request to the workflow module 504. Workflow module 504 may proceed to execute steps as described above. Workflow module 504 may access impact analyzer to determine what information workflow module 504 has and what is needed to complete workflow steps. For example, referring to the table above, workflow module 504 may determine that it is unable to complete the steps within a workflow because the information the workflow module 504 has is limited to username, client ID, and LOA3. Then, workflow module 504 may access aggregator 522 if workflow module 504 determines that it cannot continue with the information workflow module 504 has, and may provide aggregator 522 with the information workflow module 504 currently has. For example, to continue the above example, workflow module 504, having determined that it cannot proceed because it lacks needed information, may access aggregator 522, providing username, client ID, and LOA3 as parameters.

Aggregator 522 may then use known information to query for additional information. Aggregator 522 may query information index 528 for stored information. Available information (if any) may be passed from information index 528 to aggregator 522. Aggregator 522 may query business capability service 540 for relevant services. If relevant services are found, then a list of the available services may be returned to aggregator 522. If aggregator 522 receives an indication of relevant services from business capability service 540, then aggregator 522 may call each of those services, in parallel or in serial, and subject to any access control limits placed on aggregator 522 with respect to those services. In addition to aggregator 522, steps in a workflow and system of action 520 may invoke business capability service 540 or other services/process APIs. Information from system of interaction 520 may be transformed from canonical message format to a format specific to business capability service 540 before being sent to business capability service 540. Similarly, results from business capability service 540 may be translated into canonical message format before being transferred by system of interaction 520. Translation may involve the creation of a dynamic web service and API call, wherein the API call includes input properties.

Once workflow module 504 has accessed aggregator 522 and retrieved information obtained from relevant services, workflow module 504 may input the information into the executed steps. In particular, missing information (e.g., employer and income) may be added and the step may be considered complete. If the step is considered complete, then the workflow module 504 may proceed to execute the next step according to a step ordering or other algorithm (e.g., a tree traversal algorithm, in an embodiment wherein the steps are hierarchically ordered). In some embodiments, an indication of step completion may be transmitted to client 502. In some embodiments, workflow module 504 may be unable to determine missing information. In such cases, workflow module 504 may include instructions which cause a response to be generated which includes, as described above, a dynamic UX application (or portion thereof) soliciting the missing information from the user. The response may be transmitted to client 502 for display and collection.

IV. Additional Example Environments for Generating Dynamic UX Applications

An experience manager may be a presentation layer component that is embedded with client. In that case, there may be a clear separation of concerns between presentation and business layers, but any change in the experience manager may require time-consuming UI application build and deployment with additional regression testing. Reconfiguring the UI based on a user profile or activity may be very difficult. Further, changes to the canonical data model may require rebuilding and redeploying any UI components. In general, the purpose of the experience manager component is to return UI controls dynamically based on individualized UX rules. It should be appreciated that there are many ways to accomplish this goal, and the optimal abstractions may depend on the underlying hardware configuration. For example, a thin client or underpowered mobile device may have different device capabilities than a top-of-the-line smart phone, and may demand alternate methods of delivering dynamic UX applications. By separating workflow/step execution, and user experience modules (and related components) and building consistent APIs in front of them, modifying or reconfiguring user interfaces and user experience may be done very quickly without affecting client code or step/workflow execution.

Figure 6:
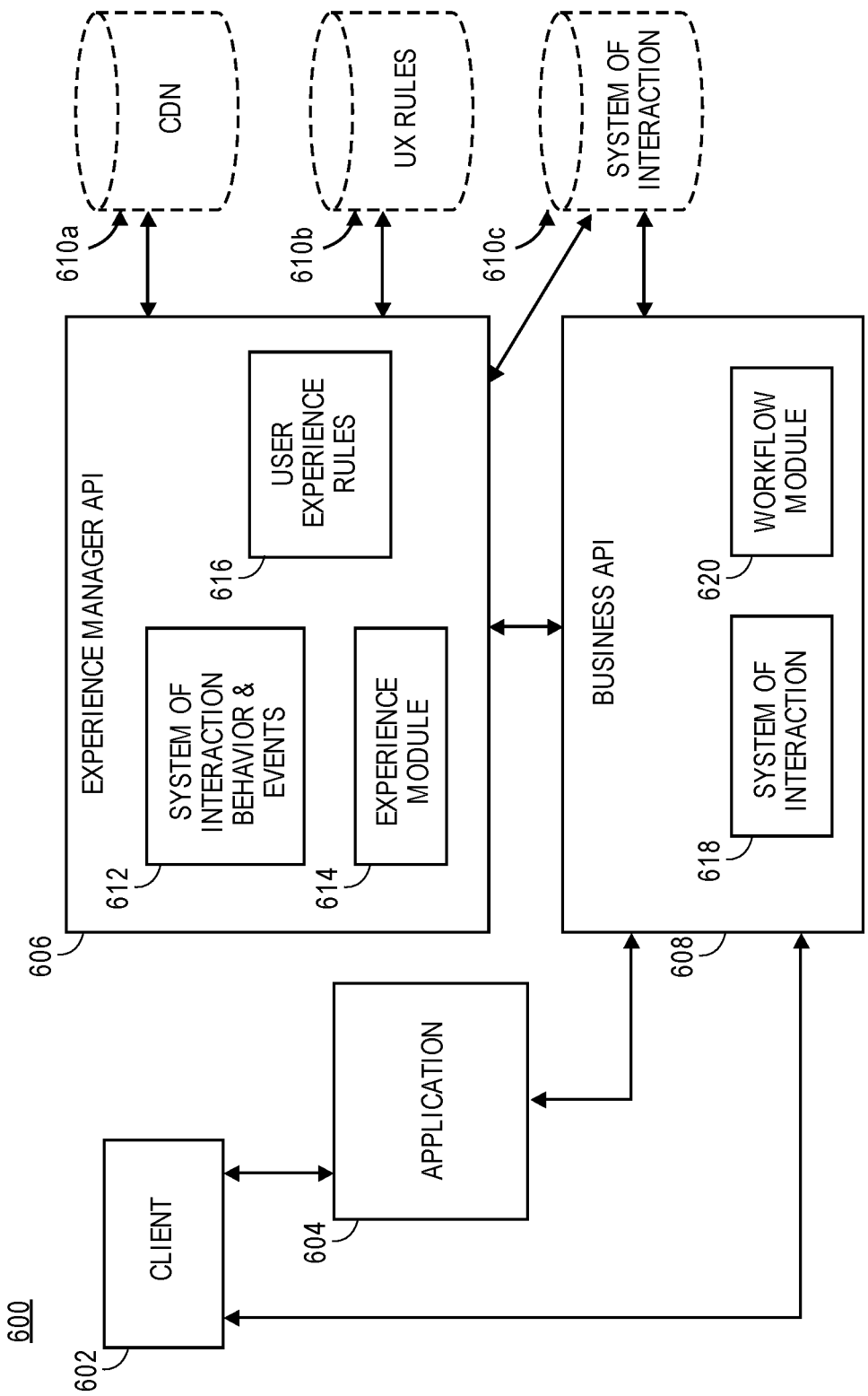
FIG. 6 depicts an example data flow diagram for implementing dynamic UX applications as application programming interfaces, in accordance with some embodiments.

Turning to FIG. 6, an example environment 600 for generating workflow-based dynamic UX applications which separate the application components as a series of APIs or services is depicted, according to an embodiment. Environment 600 may include a client 602 which may correspond to client 502, user device 304, and client 104. Environment 600 may further include an application 604, which may correspond to application 122 and/or application 168. Environment 600 may further include an experience manager API 606 and business API 608. Experience manager API may correspond to, or implement, experience module 310, experience manager 206, and experience module 132.

The embodiment depicted in environment 600 may help to separate the presentation logic-related components from the business logic layer. Modules may be organized according to function, and may be wrapped in an API layer which allows the modules to be accessed indirectly. In an embodiment, application 604 may call business API 604 first and experience manager 612 second, after receiving a response from business API 408. In this way, experience manager 612 may be an optional component for the dynamic UX experience consumer. Clear separation of concerns between presentation and business layers may be achieved and presentation and business layers may operate completely independently of one another. Application 604 may be able to issue API calls to business API 608, and need only be programmed to access a uniform business API. Then, various components of business API may be mapped to those calls (e.g., workflow module 620). Additionally, business API 608 may include instructions to access experience manager API 606, which may determine UX. In some embodiments, some or all of dynamic UX applications may be cached in content delivery network (CDN) 610a, which may be accessed by application 604. Also, UX may be determined by a configurable service such as experience manager 606 using a UX rules component 616 accessing a UX rules database 610b. Experience manager 612 may also determine user experience by querying system of interaction behavior and events 612, which may contain historical user preferences and events related to past user behavior. Regardless of whether UX is being determined based on user experience rules 616 or system of interaction behavior and events 612, business API will make the same API call. Therefore, workflow module 620 need not include specific logic for acquiring a user experience—workflow module 620 need only include instructions for querying experience manager API 606.

Dynamic UX application consumers (e.g., business API 608) may access experience manager API 606 based on need. Page layout, input validation (meta data), and page styling can be quickly changed from the configurable user experience manager 606. Any change or additions of new UI fields (e.g., adding a new question) may be externalized and configured in experience manager 606, and no change to the client 602 is necessary if the user experience changes.

Figure 7:
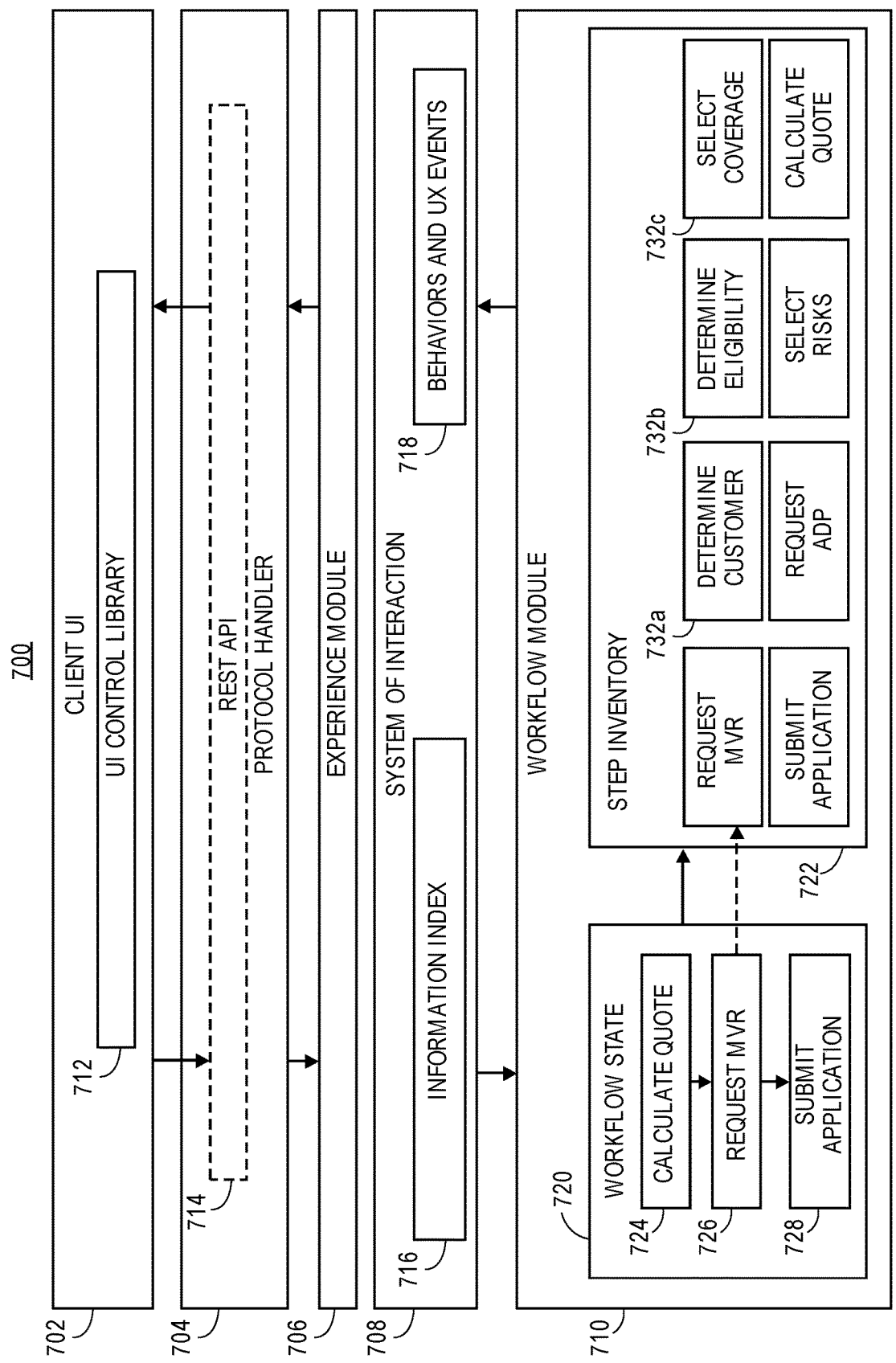
FIG. 7 depicts an example flow diagram for workflow execution, according to some embodiments.

With regard to FIG. 7, a data flow diagram for multiple workflow execution is depicted, according to an embodiment. As shown, a user may submit a request from a client 702, which may correspond to client 104, client device 304, client 502, and/or client 602. The request may be received a protocol handler 704, which may correspond to protocol handler 136. The request may be translated/processed by protocol handler 704, and passed to workflow module 710. Workflow module 710 may correspond to business API 608, workflow module 504, workflow module 308, workflow module 204, and/or workflow module 126. In general, workflow module 710 may be located in a server, but may also be integral to a client. Workflow module may examine the request from client 702, and may begin executing a workflow. Execution of the workflow may be performed by workflow state machine 720. Workflow module 710 may transmit output of the executing workflow in whole or in part to experience module 706, where dynamic UX may be applied to the output by experience module 706. For example, experience manager 706 may comprise an experience engine that performs a number of functions. First, experience manager 706 may retrieve customer (e.g., applicant) information from information index 716 for display and UX rule execution. Experience manager 706 may retrieve user behaviors and/or UX events for UX rule execution from behaviors and UX events 718 within system of interaction 708. An interaction ID may be passed as a parameter to the system of interaction 708 to look up information corresponding to the current interactions associated with the customer. Experience engine 706 may execute UX rules to determine how to collect/present information in client 702. For example, the sequencing of UI elements, controls to use, etc. may be determined by the execution of UX rules. Experience engine 706 may also determine a template for the overall layout, which may be provided as executable code to client 702. Experience module 706 may prepare canonical data for transmission to protocol handler 704, and may prepare metadata for each canonical data element.

Addition of dynamic UX may be based on analyzing behaviors and UX events 718. Behaviors and UX events 718 may include actions that a user of client 700 has taken when using the environment 700 previously (e.g., the speed at which the user has proceeded through steps in a workflow). The user may be associated with client 700 and behaviors and UX events 718, respectively, by a session, cookie, user identifier, or other suitable data. After dynamic UX is added, in canonical data format, the data may be passed to protocol handler 704, which may convert the canonical data format to a format that can be read by client 702. As shown, a REST API 714 may be used to translate client requests and responses to and from canonical data format. As depicted, client 700 may include a UI control library which implements various UI components that may be used in the rendering of the dynamic UX application and portions thereof. UI control 712 identifiers may map controls in client 700 to UI fields (e.g., text field, drop-downs, etc.). Experience manager 706 may generate a relative sequence for display elements, mark fields as editable or read-only, and/or inject scripts into a dynamic UX application. For example, a hide/show indicator may be inserted by experience manager 706.

The dynamic UX application may be generated by workflow module 710. Specifically, in operation, a request may be received by workflow module 710 in which a customer seeks to apply for an insurance quote. The request may pass through protocol handler 704 and may include an interaction ID. Workflow manager 710 may cause workflow state 720 to begin executing a first workflow 724, which may execute a series of steps. Workflow state 720 may then initiate a second workflow 726, which may include steps 732a-732c. Before executing step 732a, workflow 726 may request applicant information from system of interaction 708, passing interaction ID as a parameter. System of interaction 708 may locate an interaction having the customer/applicant's name, gender, birth date, and phone number. System of interaction 708 may provide an indication of the information it has to workflow manager 710. Next, workflow state 720 may determine that driver's license number is missing from the information provided by system of interaction 708. Workflow manager 710 may then send a response to experience manager 706 indicating that metadata is missing, specifically, the customer's driver's license number. Experience manager 706 may then craft a response prompting the customer for his or her driver's license number, based on the customer's user preferences. Experience manager 706 may pass that response to protocol handler 704, which may translate the response and transmit it via REST API 714 to client 702, where it may be displayed by UI control library 712 to the user. The user may provide the driver's license number, at which point the workflow may proceed.

Experience manager 706 may have access to pieces of information that enable it to better personalize the UX. For example, experience manager 706 may access a user's identity or persona/segment, current business context/objective, previous interactions via system of interaction 708, and business processes' information of the customer. Many pieces of information may be analyzed in personalizing a user's experience. The examples herein discuss details pertaining to the user's use patterns and/or personal attributes, however, in some embodiments other external information (e.g., time, location, and weather) may be factored into the UX by the experience manager 706.

Once step 726 is complete, workflow state 720 may execute workflow 728. Workflow 728 may include a single step, which may transmit the user's application, and may also contain logic for processing a result of the submission. For example, the submission may be approved, denied, or pended. The step may notify a user or take another action depending upon the result of the submission.

ADDITIONAL CONSIDERATIONS

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device or other smart devices). Of course, local storage and use of a disposable UI at a user device (e.g., the client device 102 of FIG. 1) by an anonymous user may have the benefit of removing any concerns of privacy or anonymity, by removing anything except the minimum user interface elements needed to render steps and workflows, without storing data permanently on the client device. In such instances, there may be no need for affirmative consent.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computerized method of delivering a dynamic user experience application to a user, the computerized method comprising:
   receiving, in a remote computing system, a business objective of the user included in a request object generated by a device of the user;
   selecting, by one or more processors of the remote computing system analyzing the request object, a workflow corresponding to the business objective, wherein the workflow is associated with one or more executable steps that execute differently based on a role of the user;
   generating, by the one or more processors analyzing the one or more executable steps, the dynamic user experience application, including at least one user interface corresponding to the business objective of the user, wherein generating the dynamic user experience application includes:
      determining a sequence of the one or more executable steps by applying a machine learning algorithm to the one or more executable steps, and
      ordering the one or more executable steps according to the sequence;
   transmitting, by the one or more processors and to the device of the user, at least a portion of the dynamic user experience application; and
   causing to be displayed, on the device of the user, the at least one user interface by causing the device of the user to execute the portion of the dynamic user experience application according to the sequence.

2. A computing system, comprising:
   one or more processors; and
   one or more memories storing instructions that, when executed by the one or more processors, cause the computing system to:
      receive a business objective of a user included in a request object generated by a device of the user;
      select a workflow corresponding to the business objective, wherein the workflow is associated with one or more executable steps that execute differently based on a role of the user;
      generate, by analyzing the one or more executable steps, a dynamic user experience application including at least one user interface corresponding to the business objective of the user, wherein generating the dynamic user experience application includes:
         determining a sequence of the one or more executable steps by applying a machine learning algorithm to the one or more executable steps, and
         ordering the one or more executable steps according to the sequence;
      transmit, to the device of the user, at least a portion of the dynamic user experience application; and
      cause to be displayed, on the device of the user, the at least one user interface by causing the device of the user to execute the portion of the dynamic user experience application according to the sequence.

* * * * *